United States Patent [19]

Muszkiewicz

[11] 4,399,557

[45] Aug. 16, 1983

[54] MINIMUM POWER, FEEDBACK CONTROLLER, TRANSMIT/RECEIVE SWITCH

[75] Inventor: Robert P. Muszkiewicz, Tempe, Ariz.

[73] Assignee: Motorola Inc., Schaumburg, Ill.

[21] Appl. No.: 330,979

[22] Filed: Dec. 15, 1981

[51] Int. Cl.³ .............................................. H04B 1/44
[52] U.S. Cl. ......................................... 455/82; 455/83
[58] Field of Search ....................... 455/19, 73, 78, 79, 455/82, 83

[56] References Cited

U.S. PATENT DOCUMENTS

| | | | |
|---|---|---|---|
| 2,935,605 | 5/1960 | Mathieu | 455/83 |
| 3,227,954 | 1/1966 | Fichter, Jr. | 455/82 |
| 3,988,675 | 10/1976 | Dykas | 455/78 |

Primary Examiner—Jin F. Ng
Attorney, Agent, or Firm—Eugene A. Parsons

[57] ABSTRACT

A transmit/receive switch incorporating a latching relay in a feedback circuit so that the relay is energized only when it is commanded into a different mode (transmit or receive) than it is in, and the energization is removed as soon as the relay switches into the correct mode.

12 Claims, 3 Drawing Figures

MINIMUM POWER, FEEDBACK CONTROLLER, TRANSMIT/RECEIVE SWITCH

BACKGROUND

1. Field of the Invention

The invention relates to the field of transmit/receive devices.

The invention particularly relates to transmit/receive devices utilizing a single antenna for both transmit and receive functions.

The invention specifically relates to the field of transmit/receive switches for use in such devices to minimize power consumption required to switch the antenna to the appropriate device, utilizing minimum power consumption in performing said switching operation and in maintaining connection with the appropriate device.

The invention further relates to transmit/receive switches wherein inadvertent switching of the antenna to the nonappropriate transmit/receive device is inhibited.

2. Prior Art

Transmitting and receiving installations require both transmitting and receiving antennas. The transmitting antenna couples the information to be transmitted into the atmosphere. The receiving antenna acts as a collector of energy radiated into the atmosphere by a transmitting device. When the transmitter and receiver are located at the same site it is important that the information being radiated at a high energy level by the transmitter be decoupled from the receiving device lest energy be received by the receiver at a level which might be damaging to the receiver. To this end, the receiving device is frequently disconnected by means of a relay which is activated while the transmitter is operative.

Certain installations utilize a single antenna for both transmit and receive functions. Means must then be provided to properly time share the usage of the antenna by the transmitter and the receiver devices. Such time sharing devices may comprise simple control relay mechanisms or radiated energy activated devices in wave guide systems or the like.

As the art has progressed, it has become possible to produce hand-held transmit/receiver devices denoted generically as transceivers. Limiting the usefulness of such transceiver devices is the power source available for energizing both the transmit and the receive function. The load carrying capacity of a battery is generally reduced in direct proportion to size reduction of the battery. Thus, miniaturization of transceiver devices is, in general, limited to the battery power supply utilized with the device. Trade offs may be made in terms of useful life of the transistor for any given battery size versus range and power handling capabilities of the transceiver also as a function of battery size and capacity. It is therefore desirable that components of transceiver devices be modified wherever possible to reduce or eliminate current drain on the battery supply.

Transceivers frequently employ a relay which in its non-activated state connects the antenna of the transceiver to the receiver device. When the operator wishes to transmit, he initiates a transmit command, usually by operation of a transmit switch, which energizes the antenna relay causing it to switch the antenna from the receiver to the transmitter device within the transceiver. Current must flow to the relay to hold it in its transmit position while the operator is transmitting. This current drain, to maintain the relay energized, limits the power handling capabilities of the transmitter device and decreases the useful working life of the battery power supply. To avoid this current drain, those skilled in the art have replaced such conventional switching relays with latching type relays which need be energized only to initiate a change in state. Once the switch has changed its state it wil hold its switched position without the need for further energization. Thus the current drain required of such a latching relay is less than that normally required for conventional relays.

Latching relays, however, pose other problems. Should the operator disconnect the power from the transceiver while the transceiver was still in the transmit mode, the latching relay would remain in the transmit mode when next the transceiver was powered. Thus, although the operator would not be keying the transmitter device, the antenna would be connected to the transmitter and no energy from a distant source already radiated into the atmosphere would be able to be received by the transceiver in this condition. A similar result might well obtain should the transceiver suffer a shocking jar causing the latching relay contacts to move from the receive position to the transmit position. Again, the antenna relay would be in a non-operative position. When the operator established a command to switch the transceiver to the transmit function, the relay would be activated so as to connect the antenna to the receiver. In this instance, no energy would be radiated into the atmosphere from the transceiver. The possibility of a latching relay assuming such ambiguous positions is seen to be highly undesirable.

An additional problem concerns changing of the operating mode of the transceiver by the operator before the latching relay has achieved a steady state condition. A prescribed time interval, during which power must be applied to the relay coil, is required for the transition of the contacts from one position to another. If the operator were to command the transceiver initially to the transmit function and then re-command it to the receive function before the initial command had been completed, simultaneous energization of the relay coils would result which could damage the relay. Even if damage would not occur, the eventual final state of the relay contacts would be unknown and ambiguity in the relay state results.

It is an objective of the present invention to provide a transmit/receive switch which will require minimal current drain from the transceiver power supply in order to achieve proper functioning of the switch.

It is a particular objective of the invention to provide a transmit/receive switch having provision to automatically inhibit ambiguous positioning of the switch contacts.

It is a specific objective of the invention to provide a transmit/receive switch utilizing a feedback control circuit in conjunction with a latching relay so as to provide unambiguous, low loss, voltage-controlled connection of a common antenna to either a transmitter or receiving device within a transceiver which transmit/receive switch requires no steady state relay operating power.

It is a further objective of the invention to utilize logic circuitry in hybrid form to provide a transmit/receive switch of extremely small size.

SUMMARY OF THE INVENTION

The invention represents an improvement in a transceiver comprising an antenna and transmitting and receiving devices which alternatively share use of that antenna by switching means which are controllable to selectively couple either one of the transmitter or receiver devices to the antenna in response to a selected transmit/receive control signal from a control signal source. The improvement minimizes power consumption of the switching means for switching the antenna between the receiver and transmitter devices and assures that the selected transmitter or receiver device is coupled to the antenna in response to the control signal. The improvement comprises logic means coupled to the source of the transmit/receive control signal as well as the switching means. The logic means compares the status of the switching means with the control signal and actively energizes the switching means only when its status disagrees with the status commanded by the transmit/control signal. In the embodiment illustrated, the switching means comprises a latching relay and circuitry for actuating said relay. Feedback coupling means are provided to couple the logic means and the switching means and to feedback a signal to the logic means representative of the status of the latching relay. The logic means outputs a signal which is coupled to the switching means and is selectively activated to output the signal to the switching means so as to control the status of the relay only when the feedback signal from the switching means disagrees with the status commanded by the transmit/receive control signal. Thus, when the latching relay is in the received status and the transmit/receive control signal commands transmit status, the feedback signal will cause the logic means to output a control signal which will change the status of the latching relay to the receive status. On the other hand, should the transmit/receive control signal command a transmit status and the latching relay already is in the transmit status, means are provided for inhibiting the output of a latching relay drive control signal so that the latching relay will remain in the commanded state. A similar function is provided for when the transmit/receive control signal commands receive status. Latching relay drive means outputing a signal capable of activating the latching relay is provided and is responsive to the drive control signal output by the logic means. Embodiments are disclosed wherein the latching relay comprises either one of a single pole double throw latching relay or a double pole double throw latching relay. A logic truth table for the proper functioning of the logic means is disclosed and an embodiment of a logic means conforming to such truth table is presented.

DETAILED DESCRIPTION OF THE INVENTION

Figure 1:
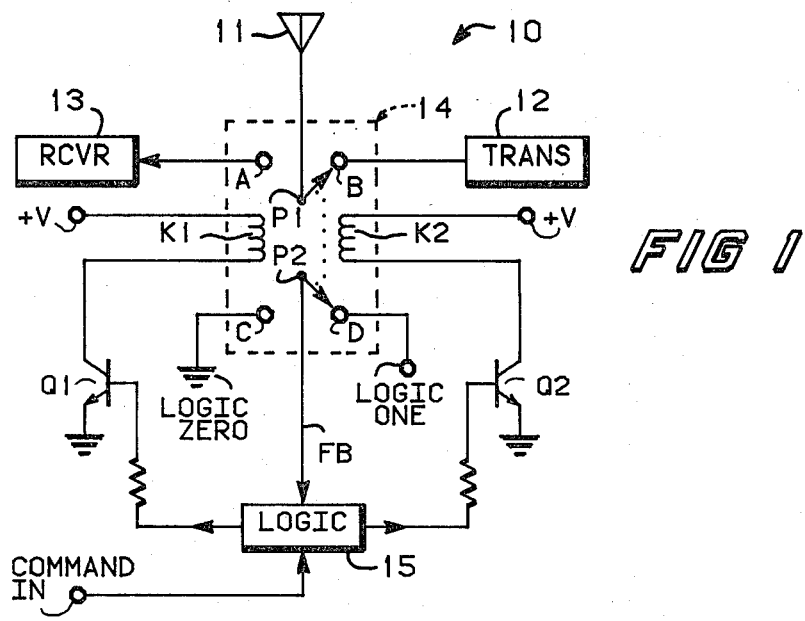
FIG. 1 is a schematic/block diagram of a portion of a transceiver device utilizing the transmit/receive switch of the invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 illustrates a schematic/block diagram rendition of a transceiver 10 having an antenna 11 which is shared by a transmitter 12 and a receiver 13. A latching relay 14 provides the mechanism for alternatively coupling antenna 11 to transmitter 12 and to receiver 13. Latching relay 14 comprises a double pole double throw (DPDT) latching relay. A pole P1 of latching relay 14 is connected to antenna 11. A wiper arm of pole P1 couples the transmitter 12 to antenna 11 through a latching relay contact B. Similarly, the receiver 13 is alternatively coupled to antenna 11 through a contact A via the wiping arm of pole P1.

Operationally, when a relay coil K2 is energized, the wiping arm of pole P1 moves to connect pole P1 to contact B. Once the wiper arm has been moved to contact position B, no further energization of coil K2 is required to maintain the wiping arm in contact with contact B. Similarly, when a coil K1 of latching relay 14 is activated, the wiping arm of pole P1 is drawn to contact A and the contact will be maintained even though current no longer flows through coil K1. The ability of the wiping arm to maintain its position on a given contact, its latching thereto, is what gives the relay 14 its name: a latching relay.

One end of each of the relay coils K2 and K1 is connected to a voltage source V. The other end of coils K1 and K2 are connected to collector electrodes of a pair of transistor switches Q1 and Q2, respectively, the emitters of which are connected to ground.

Logic module 15 is provided to generate control signals to activate either transistor switches Q1 or Q2 so that relay drive current may be provided to the proper coil, K1 or K2 to drive the wiping arm of latching relay 14 to its proper position. As noted in the background discussion, latching relays are prone to assume ambiguous switched positions as a result of power failure while in one mode of operation and re-energization while in another mode of operation. Similarly, shock may cause the contacts to move to the improper position. In order to avoid such ambiguity, latching relay 14 is provided with a second pole P2 which couples a feedback signal along path FB from a logic level ONE source connected to a relay contact D or, alternatively, a logic level ZERO source connected to a contact C of latching relay 14.

Logic module 15 will compare the feedback signal FB with a command input so as to compare the actual status of latching relay 14 with the input command to determine whether one of switch transistors Q1 or Q2 should be activated to change the status of latching relay 14, or whether no activation of that relay should be undertaken.

The command input may be the signal derived from a simple push-to-talk switch. By way of example it shall be assumed that the input command requiring that transmitter 12 be coupled to antenna 11 through latching relay 14 shall be achieved when the input command represents a logic level ONE. It must then be assumed that a logic level ZERO shall result in antenna 11 being coupled to receiver 13.

As the background discussion indicated, a latching relay is chosen so that it shall be unnecessary to continuously draw relay current to hold the relay in a selected position while transmitting or receiving. It will now be disclosed that the need to draw current will be further reduced by totally inhibiting a latching relay drive signal in those instances in which the relay 14 is already in the switch state coinciding with the input command. As an example, assume that the schematic/block diagram of FIG. 1 represents the latching relay to be in the transmit switch status. In this instance, as shown, transmitter 12 is connected through contact B and pole P1 to antenna 11. A logic level ONE signal is fed back via FB via latching relay 14 contact D and pole P2. This signal, the logic level ONE fed back to the logic module 15, is compared with the input command which in this instance shall be assumed to also be a logic level ONE. Since both the feedback command and the input command coincide in that latching relay 14 is commanded to be in the transmit state and the feedback indicates that the relay is indeed in the transmit state, no control signal will be fed from logic module 15 to the base of transistor switch Q2. Therefore, no current will be drawn by coil K2 and, thus, unnecessary current drain will have been inhibited.

However, assume that the input command was a logic level ZERO, commanding that latching relay 14 shall be in the receive state. Feedback FB, at the high logic level ONE indicates that relay 14 is in the transmit state. Logic module 15, in this instance, will output a high level signal to the base of transistor switch Q1 drawing transistor Q1 into conduction and thus permitting current to flow through coil K1 so as to activate relay 14 drawing the wiper arm of pole P1 to contact A and the wiper arm of pole P2 to contact C. With pole P2 in contact with contact C, a logic level ZERO is fed back along path FB to logic module 15. At that instant, both the feedback FB and the input command shall be at logic level ZERO. Logic module 15 shall immediately cause the base of switch transistor Q1 to go low thus inhibiting current flow therethrough and preventing further current drain through coil K1.

If the input command again goes to logic level ONE while pole P2 is in contact with contact C, logic module 15 will cause the base of transistor switch Q2 to go high thereby drawing current through coil K2 to change the switch status of latching relay 14 back to the transmitter state. At that time, feedback FB will again be at the high logic level ONE and the base of transistor switch Q2 will be allowed to go low so as to inhibit further current flow through relay coil K2.

Thus with the circuit disclosed in FIG. 1 it is unnecessary to maintain relay drive current due to the latching characteristics of relay 14 and it is unnecessary to provide a drive current when latching relay 14 is already in the desired state being commanded.

It will be readily seen that should a shock cause the wiper arms of poles P1 and P2, which are mechanically coupled, to move from the desired contact state to an undesired contact state, the feedback signal FB will immediately disagree with the logic level of the input command. Thus one of the transistor switches Q1 or Q2 will be activated to cause latching relay 14 to switch from the undesired state to the commanded state.

Should an operator, having the transceiver in the transmit state, immediately switch the transceiver off while maintaining the transmit/receive switch in the transmit/command state, latching relay 14 will remain in the command state while the transceiver is de-energized. Most transceiver devices are automatically returned to the receive command status when first energized. In the instance under discussion, with latching relay 14 having been de-energized in the transmit state, first activation of the transceiver will command that relay 14 be placed in the receive status. Thus a low level ZERO command will be input to the logic module 15. The high level feedback signal FB will disagree with the input command and therefore logic module 15 will cause the base of transistor switch Q1 to go high enabling current to flow through relay coil K1 so as to move the contacts of relay 14 from the transmit state to the receive state. When this is accomplished both the feedback and the input command will be at the low logic level ZERO and current will immediately cease to flow through coil K1 since the logic module 15 will force the base of transistor switch Q1 to a low level.

Figure 2:
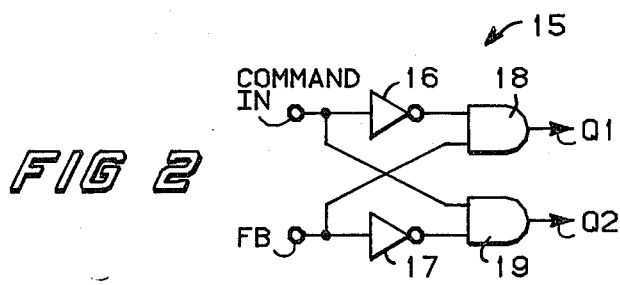
FIG. 2 is an example of a logic circuit which will perform the logic functions required of the circuitry of FIG. 1.

Those skilled in the art will conceive of many logic circuits which will accomplish the functions described in the aforesaid discussion of FIG. 1. The schematic of FIG. 2 is offered as an illustrative example of one of the many logic systems available to achieve the ends here required. The input command is coupled to the input of an inverter 16 and to one of dual inputs of an AND gate 19. The output of inverter 16 is coupled to a first input of a dual input AND gate 18. The feedback signal FB from latching relay 14 is coupled to the input of an inverter 17 and to the second input of AND gate 18. The output of inverter 17 is connected to the second input of dual input AND gate 19. The output of AND gate 18 is coupled to the base of switching transistor Q1 while the output of AND gate 19 is coupled to the base of switching transistor Q2. In operation, the logic module of FIG. 2, logic module 15, functions in accordance with the following logic truth table:

TRUTH TABLE

| STATUS | COMMAND | INITIAL FB | Q1 | Q2 | RESULT FB |
|---|---|---|---|---|---|
| 1 | 1 (T) | 1 (T) | 0 | 0 | 1 (T) |
| 2 | 0 (R) | 0 (R) | 0 | 0 | 0 (R) |
| 3 | 1 (T) | 0 (R) | 0 | 1 (T) | 1 (T) |
| 4 | 0 (R) | 1 (T) | 1 (R) | 0 | 0 (R) |

Figure 3:
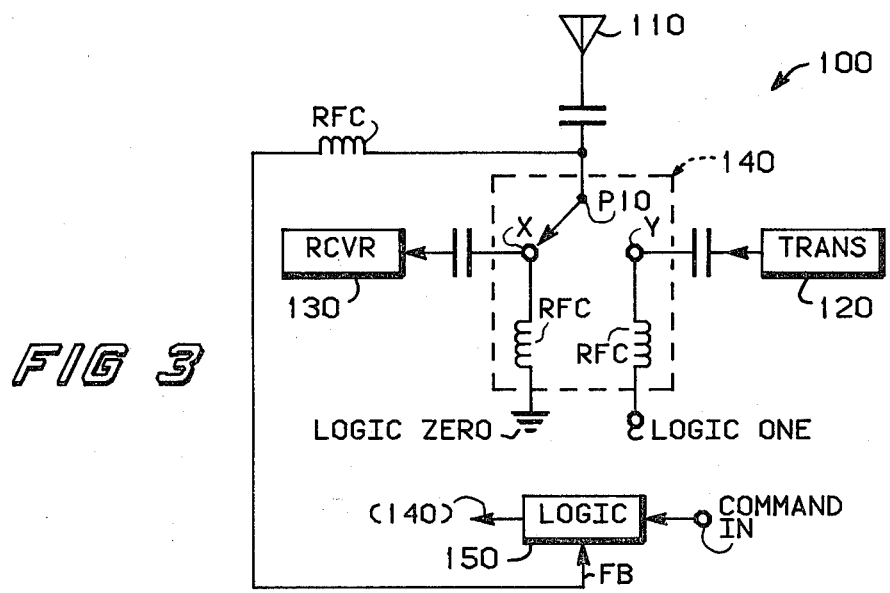
FIG. 3 is a schematic/block diagram of the invention in which a single pole double throw latching relay is employed.

Although the invention has been disclosed thus far utilizing a DPDT latching relay 14 similar results may be achieved with a single pole double throw (SPDT) latching relay 140 shown in FIG. 3. Here a feedback path is provided from a pole P10 back to a feedback input FB to a logic module 150. Pole P10 of relay 140 is coupled to an antenna 110 which is switched between a receiver 130 and a transmitter 120 by latching relay 140. When latching relay 140 is in the receive state a feedback signal is supplied through a relay contact X, the wiper arm of pole P10 and the feedback input FB. This feedback signal is compared with the input command signal by a logic module 150 in a manner analogous to that performed by logic module 15. When the command input and the feedback signal are the same, no energy is output from the logic module 50 to activate relay 140. Similarly, when the wiper arm of pole P10 is in contact with a contact Y, the feedback path is through contact Y pole 10 and the feedback input FB to logic module 150. Again, if both the feedback signal and the input command are of a logic level ONE, for example, no further output will be required from logic module 150 to energize relay 140. However, in the event that the command input is different from that of the feedback signal, logic module 150 will output a drive signal to relay 140 to change its switch state.

In accordance with good practice RF chokes (RFC) are provided to block RF from the logic circuitry and DC block capacitors are employed to prevent any of the DC voltages within the logic module 150 from affecting the transmitter or receiver devices.

What has been disclosed is a transmit/receive switch which is voltage controlled and displays a zero steady state coil operating power drain requirement and a minimum actuation power drain requirement. Because the logic circuitry required can be provided in hybrid form on small chip assemblies the apparatus of the invention may assume a very small size. This is unlike the very large coil requirements of prior art antenna switching devices. The invention provides a feedback control circuit in conjunction with a latching relay to provide an unambigious, low loss voltage controlled RF transmit/receive switch which requires zero steady state and minimum actuation state coil operating power for connecting a common antenna between transmitter and receiver in a transceiver device. When the input command agrees with the signal fed back indicative of the latching relay status, no operating power is consumed since the logic network provided acknowledges the fact that the switch is already in the desired state. When the latching relay is in a noncommanded state, the logic means disclosed activates the relay only so long as it is necessary to cause the relay to change its state and to indicate via the feedback path provided that its status has been changed.

Those skilled in the art will readily conceive of other embodiments of the invention which may be drawn from the teachings herein. To the extent that such other embodiments are so drawn it is intended that they shall fall within the ambit of protection of the claims appended hereto.

Having described my invention in the foregoing specifications and the accompanying drawings in such a clear and concise manner that those skilled in the art will be able to readily understand and practice the invention, that which I claim is:

1. In a transceiver comprising an antenna and transmitting and receiving devices alternatively sharing use of said antenna by switching means controllable to selectively couple a selected one of said transmitting and receiving devices to said antenna in response to a selected transmit/receive control signal from a control signal source, the improvement for minimizing power consumption by said switching means and for assuring that the selected device is coupled to said antenna in response to said control signal comprising:
    logic means coupled to the source of said transmit/receive control signal and to said switching means for comparing the status of said switching means with said control signal and actively energizing said switching means only when its status disagrees with the status commanded by said transmit/receive control signal.

2. The improvement of claim 1 wherein said switching means includes a latching relay.

3. The improvement of claim 2 wherein said switching means further includes feedback coupling means coupling said logic means and said latching relay for feeding back a signal to said logic means representative of the switched status of said latching relay.

4. The improvement of claim 3 wherein said logic means includes output signal means coupled to said latching relay and selectively activated to output a latching relay drive control signal for controlling the switched status of said latching relay only when the feedback signal coupled to said logic means by said feedback coupling means disagrees with the switch status of said latching relay commanded by said transmit/receive control signal.

5. The improvement of claim 4 wherein said logic means further comprises:
    means for outputting a latching relay drive control signal when said latching relay is in receive status, coupling said receiving device to said antenna, and said transmit/receive control signal commands transmit status of said latching switch means, coupling said transmitting device to said antenna; and
    means for inhibiting the output of a latching relay drive control signal when said latching relay has been activated to switch to transmit status in accord with said transmit/receive control signal command.

6. The improvement of claim 5 wherein said logic means further comprises:
    means for outputting a latching relay drive control signal when said latching relay is in transmit status, and said transmit/receive control signal commands receive status of said latching relay; and
    means for inhibiting the output of a latching relay drive control signal when said latching relay has been activated to switch to receive status in accord with said transmit/receive control signal command.

7. The improvement of claim 6 further comprising latching relay drive means coupled between said latching relay and said means for outputting latching relay drive control signals for selectively outputting a latching relay drive signal in response to the latching relay drive control signal output by said logic means.

8. The improvement of claim 7 wherein said latching relay comprises a single pole, double throw (SPDT) latching relay.

9. The improvement of claim 8 wherein said feedback coupling means includes circuitry for coupling the single pole of said SPDT latching relay to both said antenna and said logic means.

10. The improvement of claim 7 wherein said latching relay comprises a double pole, double throw (DPDT) latching relay.

11. The improvement of claim 10 wherein a first pole of said DPDT latching relay is coupled to said antenna and a second pole of said DPDT latching relay is coupled to said logic means.

12. The improvement of claim 3 wherein said logic means comprises means for outputting latching relay control signals in response to transmit/receive control signals to actively energize said latching relay and in further response to initial feedback signals and resultant feedback signals coupled to said logic means by said feedback coupling means in accord with the following logic truth table:

| T/R | IFB | Q1 | Q2 | RFB |
|-----|-----|----|----|-----|
| 1   | 1   | 0  | 0  | 1   |
| 0   | 0   | 0  | 0  | 0   |
| 1   | 0   | 0  | 1  | 1   |
| 0   | 1   | 1  | 0  | 0   | where T/R are the transmit/receive control signals, IFB and RFB are the initial and resultant feedback signals respectively, Q1 and Q2 are the latching relay control signals.

* * * * *